United States Patent
Lee

(10) Patent No.: US 7,069,017 B2
(45) Date of Patent: Jun. 27, 2006

(54) TRAFFIC INFORMATION COLLECTING AND PROVIDING SYSTEM AND METHOD UTILIZING PCS NETWORK SYSTEM

(75) Inventor: Byoung Heon Lee, Kyoungki-Do (KR)

(73) Assignee: LG Electronics Inc., Seoul (KR)

( * ) Notice: Subject to any disclaimer, the term of this patent is extended or adjusted under 35 U.S.C. 154(b) by 908 days.

(21) Appl. No.: 09/750,507

(22) Filed: Dec. 29, 2000

(65) Prior Publication Data

US 2001/0054098 A1    Dec. 20, 2001

(30) Foreign Application Priority Data

Dec. 30, 1999  (KR) ............................... 1999-67178

(51) Int. Cl.
*H04Q 7/20* (2006.01)
(52) U.S. Cl. .................... 455/456.1; 455/507
(58) Field of Classification Search ............... 370/328, 370/338, 331; 455/433, 440, 456, 507, 509, 455/457, 458; 379/113
See application file for complete search history.

(56) References Cited

U.S. PATENT DOCUMENTS

| | | | | |
|---|---|---|---|---|
| 5,943,621 A | * | 8/1999 | Ho et al. | 455/456.3 |
| 6,078,651 A | * | 6/2000 | Den Hartog | 379/112.06 |
| 6,091,952 A | * | 7/2000 | Xu et al. | 455/433 |
| 6,104,931 A | * | 8/2000 | Havinis et al. | 455/456.5 |
| 6,150,961 A | * | 11/2000 | Alewine et al. | 340/995.1 |
| 6,151,498 A | * | 11/2000 | Roel-Ng et al. | 455/433 |
| 6,295,454 B1 | * | 9/2001 | Havinis et al. | 455/456.3 |

\* cited by examiner

*Primary Examiner*—John Pezzlo
*Assistant Examiner*—Albert T. Chou
(74) *Attorney, Agent, or Firm*—Fleshner & Kim, LLP

(57) ABSTRACT

The present invention provides a traffic information service utilizing a PCS terminal not by independently operating the PCS network system and a traffic network system but by interconnecting a traffic information center to a PCS network system. Thus, the present invention can reduce cost of install, manage, operate, and maintain the traffic network system by making a subscriber provided with traffic information services as well as call services utilizing a PCS terminal.

46 Claims, 3 Drawing Sheets

US 7,069,017 B2

TRAFFIC INFORMATION COLLECTING AND PROVIDING SYSTEM AND METHOD UTILIZING PCS NETWORK SYSTEM

BACKGROUND OF THE INVENTION

1. Field of the Invention

The present invention relates to an intelligent traffic network system, and more particularly, to a traffic information collecting and providing system and method utilizing a PCS (Personal Communication System) network.

2. Description of the Background Art

FIG. 1 illustrates a conventional PCS network system.

The conventional PCS network system as illustrated in FIG. 1 includes: a PCS terminal; BTSs (Base Transceiver Stations) for linking wired and wireless interfaces; BSCs (Base Station Controllers) for controlling base-station tranceiver subsystem; a MSC (Mobile services Switching Center) which is a national network; and a GMSC (Gateway MSC or Telecommunication Service Center).

The PCS terminal is an apparatus for wirelessly providing services and a variety of character information services. There is a wireless interface between the PCS terminal and the BTS that operates through a wireless channel of a certain range. And, the BTS is disposed at the center of a service area.

The base station controllers (BSCs) are apparatus for controlling the base tranceiver stations (BTSs). They performs handover of calls, control of a power signal between the BTS and mobile PCS terminals, and frequency control. The BSC is quite intelligent, and performs many operations between the mobile frequency control. The BSC is quite intelligent, and performs many operations between the mobile terminal and the BTS. The BTS and BSC can be disposed at the same location, and the BSC can be disposed at the mobile services switching center (MSC).

The MSC is the core of the PCS network, and serves to set, manage, and cut a speech path by routing a call to an appropriate cell. In addition, the MSC provides a charging function and an interface for a telephone system.

The MSC has a HLR (Home Location Register) and a VLR (Visitor Location Register). The HLR is a database having subscriber location information of a corresponding area. The VLR is a database having information about whether the mobile terminal is in the off state or not, and whether it receives additional services or not.

The MSC having an interface for the telephone system is referred to as a Gateway mobile services switching center (Gateway MSC). This is a complete telephone switch capable of connecting a call between the PCS network and a fixed public switched telephone network.

Hereinafter, the operation of the PCS network system will now be described with reference to FIG. 1.

As illustrated in FIG. 1, in order to provide a call service to a certain area, the area is divided into a plurality of service areas 11 through 20, and BTSs 21 through 30 are installed and administrated at the center of the areas.

A call request signal of a PCS terminal 1 is transmitted to a MSC 310 via a BSC 210 through the base tranceiver station 21 of the corresponding service area 11. If the destination of a call is not a terminal of the same mobile communication network, the call is connected from the MSC 310 to a public switched telephone network (PSTN) via a GNSC 400. On the other hand, if the destination of the call is the terminal receiving the service of the same mobile communication network, the call is delivered from the MSC 310 to other MSC 330 in the network. The corresponding MSC 330 having received a message checks where a destination terminal is currently disposed, whether or not it is in the on state, and whether or not it receives additional services, and thereafter sends the call to the destination terminal 2 via the corresponding BSC 240 and BTS 90.

FIG. 2 is a block diagram of a conventional traffic network system.

As illustrated in FIG. 2, the conventional traffic network system includes: a plurality of vehicle terminals 610 mounted to vehicles and collecting traffic information; an on-road base tranceiver station 620 for relaying transmission/receiving of a signal between the plurality of vehicle terminals 610 and an ITS server unit 630; a plurality of ITS server units 630 connected to the on-road base tranceiver station 620 and collecting/processing traffic information; and a traffic information center 500 for generally managing/operating the plurality of ITS server units 630.

The operation of the thusly configured traffic network system will be described as follows.

Firstly, the terminal 610 is mounted to a vehicle, areas requiring to collect traffic information are selected, and thereafter the on-road base tranceiver station 620 is installed on the road of the selected area. The installed on-road base tranceiver station 620 receives a wireless signal from the terminal 610 mounted to the vehicle passing through the corresponding area, and transmits it to the ITS server unit 630. The ITS server unit 630 collects/processes traffic information to transmit the same to the traffic information.

Accordingly, the traffic information center 500 transmits traffic information of a specific area to the vehicle terminal 610 through the on-road base tranceiver station, thereby making a driver informed of the traffic state of a desired area.

However, the conventional PCS network system and traffic network system are installed/operated independently, thereby facing a system redundancy, and making a user buy an individual vehicle terminal available in the corresponding system.

SUMMARY OF THE INVENTION

Accordingly, it is an object of the present invention to provide a traffic information collecting and providing system and method utilizing a PCS network system which is capable of providing a traffic information service utilizing a PCS network system.

To achieve the above object, there is provided a traffic information collecting and providing system utilizing a PCS network according to the present invention, which includes: a PCS terminal for detecting and storing subscriber location information only once by service areas of each base tranceiver station and transmitting the detected and stored location information to the base tranceiver station, a plurality of base tranceiver stations installed on roads of specific areas requiring traffic information and receiving location information from the PCS terminal; a PCS network for transmitting the location information detected by the PCS terminal through the base tranceiver station; and a traffic information center for checking a traffic volume and congestion conditions by processing and statistically analyzing the subscriber location information transmitted through the PCS network.

In addition, there is provided a traffic information collecting and providing method utilizing a PCS network according to the present invention, which includes the steps of: outputting a control signal from a base tranceiver station to a PCS terminal; collecting subscriber location information by using the PCS terminal; transmitting the collected location information to the PCS network through the base tranceiver station; and processing the location information into a traffic information by statistically analyzing the subscriber location information transmitted through the PCS network.

Additional advantages, object and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS reference to the accompanying drawings.

In the present invention, an intelligent transportation system (ITS) network constructing a separate network is operated in the form of an additional service of a conventional PCS network. That is, data (location information) is received through the PCS network, is processed into traffic information, is stored in a traffic information center, and is provided to a subscriber requesting traffic information through the PCS network.

Figure 1:
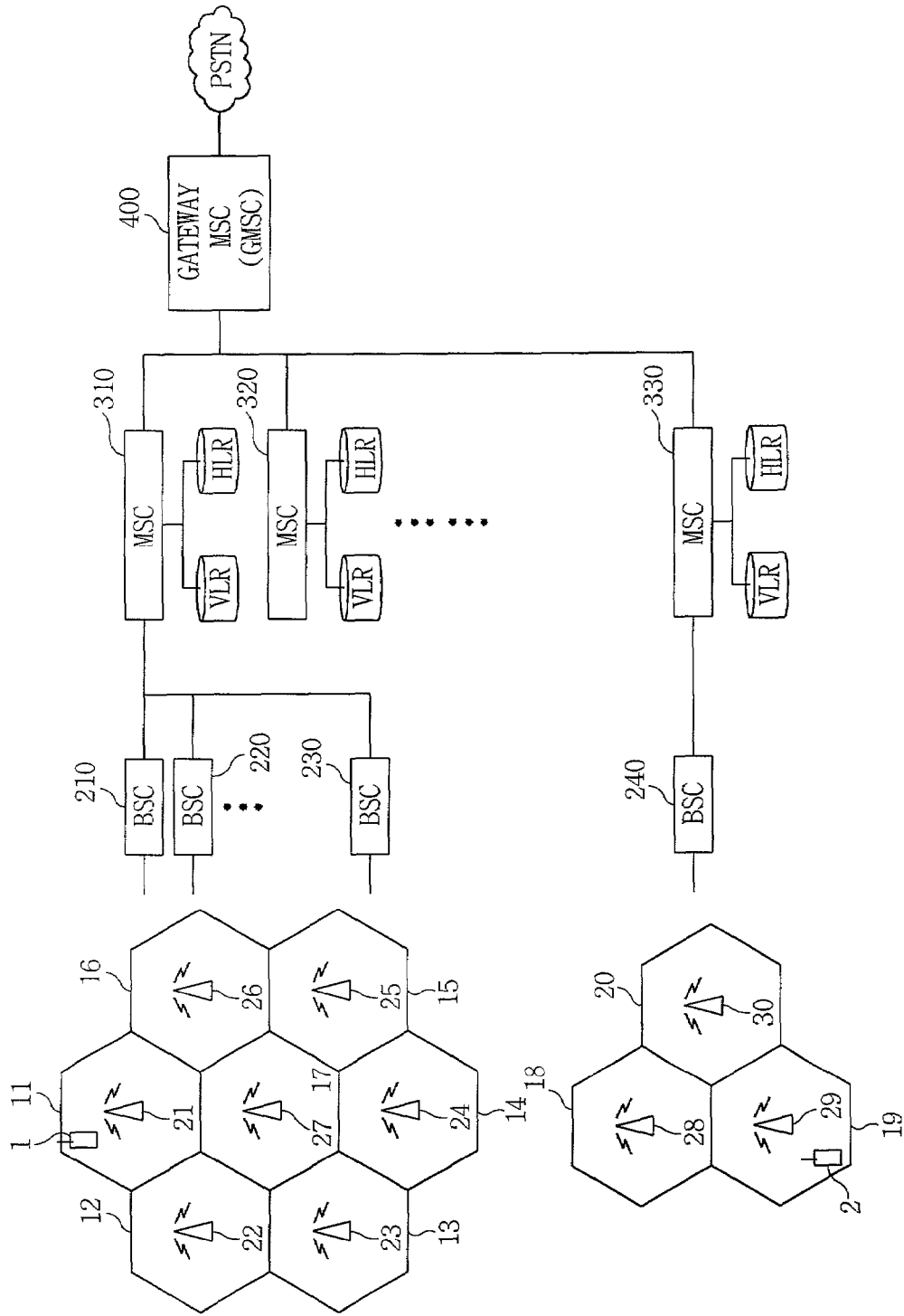
FIG. 1 is a block diagram of a PCS network system according to the conventional art.
Figure 2:
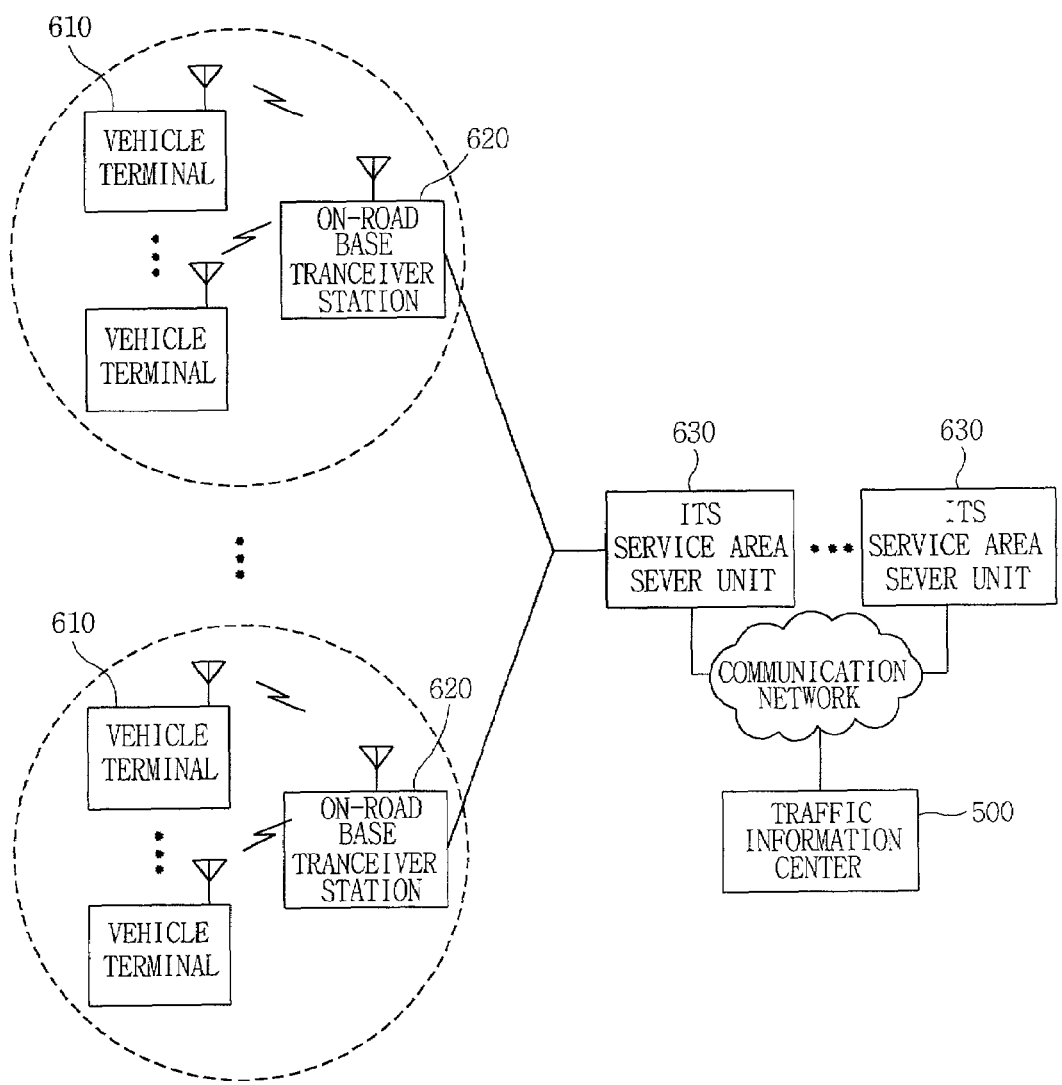
FIG. 2 is a block diagram of a traffic network system according to the conventional art.
Figure 3:
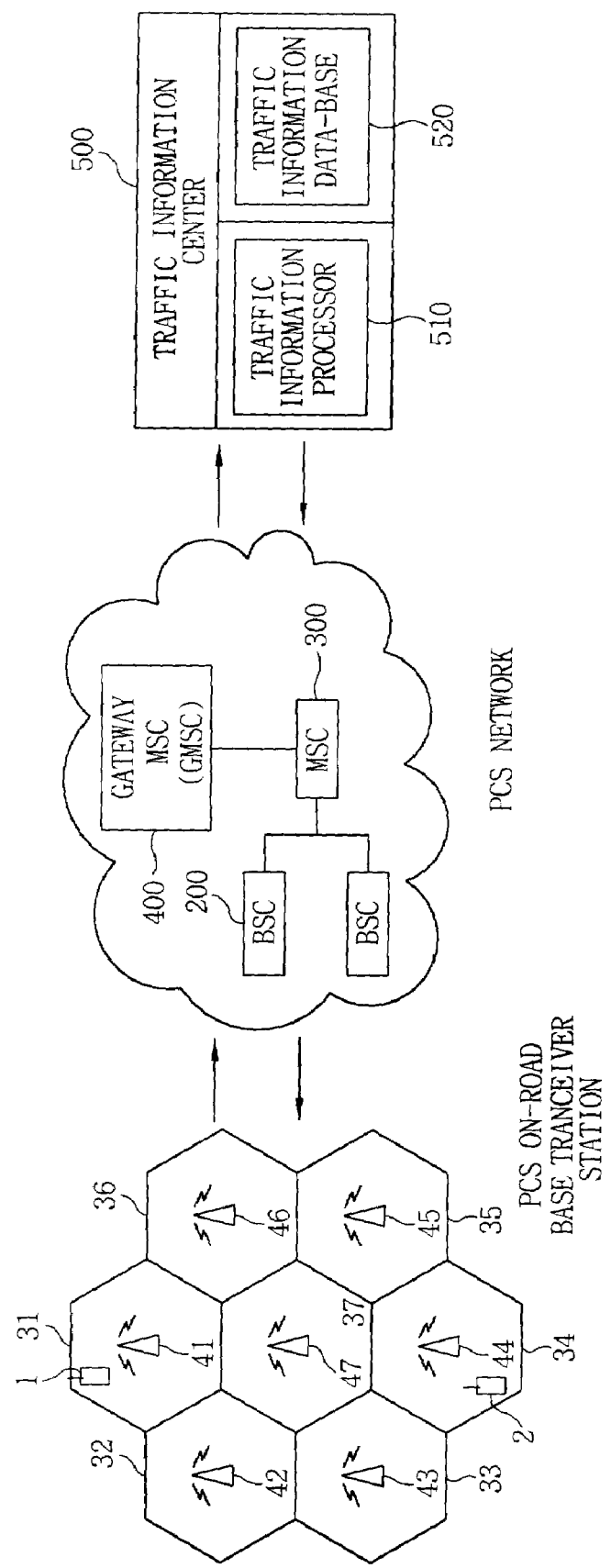
FIG. 3 is a block diagram of a traffic network system utilizing a PCS network according to the present invention.

FIG. 3 is a block diagram of a traffic network system utilizing a PCS network according to the present invention.

The system as in FIG. 3 includes: PCS terminals 1 and 2; a plurality of base tranceiver stations (BTSs) 41 through 47; a BSC 200 for controlling the base tranceiver stations 41 through 47; a MSC 300; a GMSC 400; and a traffic information center 500 for providing traffic information.

The PCS terminals 1 and 2 have general mobile communication service functions and traffic information service functions. The BTSs 41 through 47 and the BSC 200 serves to transmit subscriber location information collected from the PCS terminal 1 and 2 to the MSC 300.

The MSC 300 is the core of the PCS network that serves to set, manage, and disconnect a speech path by routing a call to an appropriate cell, and provides a billing function and an interface for a telephone system. Besides, it stores temporary information and permanent information of subscribers in a HLR and VLR.

The traffic information center 500 processes and stores subscriber location information signals received from the PCS network in the form of traffic information, and thereafter transmits them to a desired subscriber through the PCS network.

In the thusly constructed information collecting and providing system, the and thereafter transmits them to a desired subscriber through the PCS network.

In the thusly constructed information collecting and providing system, the traffic information collecting and providing method utilizing a PCS network system will be described as follows.

Firstly, the BTSs (hereinafter, T-BTS) 41 through 47 utilized for collecting traffic information are limited to ones disposed on roads of specific areas requiring traffic information. This is to optimize the operation of the base tranceiver stations and effectively separate and process information. And, the T-BTSs 41 through 47 control the number of time of transmitting location information by outputting a parameter value to the PCS terminal accessing to its service areas 31 through 37.

Thus, the PCS terminal in a running car transmits subscriber location information (the location of a subscriber and the time when the location is measured) to the T-BTSs 41 through 47. At this time, the location information is asynchronously transmitted according to a parameter value. In other words, the time interval of transmission of the location information varies by varying the parameter value according to road situations and congestion conditions.

For example, supposing that a user passes through a road at which the TBTSs 44 through 46 are installed, the PCS terminal 2 carried with the user passes through T-BTS areas 34 through 36. At this time, the PCS terminal 2 records location information only once at each area, the recorded location information are stored without being transmitted.

If the parameter value set by the T-BTS 44 is "3", the PCS terminal 2 transmits the user location information recorded at the T-BTS areas 34 through 36 to the T-BTS 46 at once via the three T-BTS areas 34 through 36 until the number of times of recording reaches three. And, the setting of the parameter value can reduce a traffic load of the network by reducing the number of times of transmitting a signal to the base-station transceiver subsystem 200 to one.

Therefore, the location information transmitted to the T-BTS 46 is sent to the traffic information center 500 via the BSC 200 and MSC 300 of the PCS network, and the collected location information is analyzed by the traffic information center 500.

A traffic information processor 510 judges whether a subscriber is walking or in a running car according to the ratio of time when a received location information signal is measured to movement distance. If the subscriber is in a running car, the time taken to pass through a specific interval, and, according to this, the traffic volume or congestion conditions of the specific interval is judged and statistically analyzed.

In this way, the location information collected from the plurality of PCS terminals are compared and analyzed with statistical values for various situations prepared by the traffic information center for thus being provided to a PCS subscriber.

However, if the statistical value is smaller than the reference value (time to movement distance) of the case that the PCS subscriber is in a running car, the information is considered to have no relation with the car running on the road regardless of the actual state of the subscriber of the PCS terminal 2, thus being removed. This removal of the inappropriate location information reduces data traffic load of the database 520.

As described above, the present invention can increase the efficiency of utilizing a communication network and a frequency by collecting/providing traffic information utilizing a conventional personal communication system (PCS).

In addition, the present invention does not need to install a traffic network system (terminal, base tranceiver station, server, etc.) in order to provide traffic information, thus greatly reducing a system redundancy and maintenance cost.

In addition, the present invention can provide convenience and economic efficiency by providing a subscriber with traffic information services as well as communication services utilizing a PCS terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A traffic information collecting and providing system utilizing a PCS network, comprising:

a PCS terminal for detecting and storing subscriber location information only once in each of a plurality of service areas having respective base tranceiver stations, and transmitting the detected and stored subscriber location information to one of the base transceiver stations, wherein the base transceiver stations are installed on roads of specific areas requiring traffic information and are capable of receiving location information from the PCS terminal;

a PCS network for transmitting the subscriber location information received from said one base transceiver station and detected by the PCS terminal; and a traffic information center for checking a traffic volume and congestion conditions by processing and statistically analyzing the subscriber location information transmitted through the PCS network, wherein the PCS terminal does not transmit the subscriber location information until a predetermined number of times of detection is reached, wherein the predetermined number of times of detection is set according to a parameter value output from at least one of the base transceiver stations, and wherein said one base transceiver station is disposed at a service area through which the PCS terminal passes for a first time among the base transceiver stations.

2. The method according to claim 1, wherein the subscriber location information includes the location of a subscriber and a time at which the location is measured.

3. The method according to claim 1, wherein the PCS terminal transmits all location information detected in the service areas at once when the predetermined number of times of detection of subscriber location information is reached.

4. A traffic information collecting and providing method utilizing a PCS network, comprising:

outputting a control signal from at least one of a plurality of base transceiver stations installed on roads of specific areas requiring traffic information to a PCS terminal, which detects and stores subscriber location information only once in each of a plurality of service areas respectively including the base transceiver stations;

collecting the subscriber location information from the PCS terminal;

transmitting the collected subscriber location information to a traffic information center; and processing the subscriber location information into a traffic information by statistically analyzing the subscriber location information by the traffic information center, wherein the control signal is a parameter value for controlling a number of times the PCS terminal detects the subscriber location information.

5. A traffic information collecting and providing method utilizing a PCS network, comprising:

outputting a control signal from at least one of a plurality of base transceiver stations installed on roads of specific areas requiring traffic information to a PCS terminal, which detects and stores subscriber location information only once in each of a plurality of service areas respectively including the base transceiver stations;

collecting the subscriber location information from the PCS terminal;

transmitting the collected subscriber location information to a traffic information center; and processing the subscriber location information into a traffic information by statistically analyzing the subscriber location information by the traffic information center, wherein said at least one base transceiver station is one disposed at a service area through which the PCS terminal passes for a first time among the plurality of base transceiver stations.

6. The method according to claim 4, wherein the base transceiver station is plurally installed, and each base transceiver station is disposed on roads of specific areas requiring traffic information.

7. A traffic information collecting and providing method utilizing a PCS network, comprising:

outputting a control signal from at least one of a plurality of base transceiver stations installed on roads of specific areas requiring traffic information to a PCS terminal, which detects and stores subscriber location information in each of a plurality of service areas respectively including the base transceiver stations;

collecting the subscriber location information from the PCS terminal;

transmitting the collected subscriber location information to a traffic information center; and processing the subscriber location information into a traffic information by statistically analyzing the subscriber location information transmitted through the traffic information center, wherein the PCS terminal detects subscriber location information only once in each of the service areas including a respective one of the base transceiver stations.

8. The method according to claim 4, wherein the subscriber location information includes the location of the PCS terminal and a time at which the location is measured.

9. The method according to claim 4, wherein the PCS terminal does not transmit the detected user location information until the number of times of detection is reached.

10. The method according to claim 4, wherein the PCS terminal transmits all location information detected in the services areas at once when the number of times of detection is reached.

11. The method according to claim 4, wherein the base transceiver stations provide general mobile communication call services and traffic information call services.

12. The method according to claim 4, wherein the PCS terminal has general mobile communication service functions and traffic information service functions.

13. A traffic information collecting and providing method utilizing a PCS network, comprising:

outputting a control signal from at least one of a plurality of base transceiver stations installed on roads of specific areas requiring traffic information to a PCS terminal, which detects and stores subscriber location information only once in each of a plurality of service areas respectively including the base transceiver stations;

collecting the subscriber location information from the PCS terminal;

transmitting the collected subscriber location information to a traffic information center; and processing the subscriber location information into a traffic information by statistically analyzing the subscriber location information transmitted through the traffic information center, wherein processing location information into a traffic information comprises;

checking a traffic volume and congestion conditions of a specific interval.

14. The method according to claim 13, wherein if it is judged that the subscriber is not in a running car, or the movement distance between measured intervals is smaller than the reference value, the corresponding location information is removed.

15. A method for determining vehicle traffic, comprising:
receiving location information from a mobile terminal;
comparing a movement distance between measured intervals with respect to time when location information is measured;
checking a traffic volume and congestion conditions of a specific interval by comparing the movement distance between measured intervals with a reference value;
determining traffic conditions along a route based on the location information; and
removing the corresponding location information, if the movement distance between measured intervals is smaller than the reference value.

16. The method of claim 15, further comprising:
transmitting information indicative of the traffic conditions to another mobile terminal.

17. The method of claim 16, wherein the traffic condition information is transmitted to the other mobile terminal in response to a request signal from the other mobile terminal.

18. The method of claim 15, wherein the location information includes:
locations of the mobile terminal along the route; and
times when the locations were detected.

19. The method of claim 18, wherein each of the locations is included within a respective one of a plurality of services areas of a mobile communication system.

20. The method of claim 19, wherein only one location for each of the service areas is received.

21. The method of claim 18, wherein the locations of the mobile terminal are received in a single transmission.

22. The method of claim 21, wherein the single transmission is received after detection of a predetermined number of locations of the mobile terminal.

23. The method of claim 22, wherein the predetermined number is indicated by a parameter transmitted to the mobile terminal.

24. The method of claim 23, wherein the parameter is varied based on at least one of road conditions and traffic congestion along the route.

25. The method of claim 15, wherein the mobile terminal performs mobile communication service functions and traffic information service functions.

26. The method of claim 15, wherein the mobile terminal is a PCS terminal.

27. The method of claim 15, wherein the location information is received from the mobile terminal through base transceiver stations located at predetermined positions along the route.

28. A system for determining vehicle traffic, comprising:
a network block which receives location information from a mobile terminal; and
a processor which, if the mobile terminal is in a moving vehicle, determines traffic conditions along a route based on the location information, wherein the processor compares a movement distance between measured intervals with respect to time when location information is measured, checks a traffic volume and congestion conditions of a specific interval by comparing the movement distance between measured intervals with a reference value, and removes the corresponding location information, if the movement distance between measured intervals is smaller than the reference value.

29. The system of claim 28, wherein the network block includes a plurality of base transceiver stations, each in a respective one of a plurality of service areas of a mobile communication system for receiving location data from the mobile terminal.

30. The system of claim 29, wherein a first base transceiver station transmits a parameter to the mobile terminal indicating a number of times location detection is to be performed, and wherein a second base transceiver station receives the location information from the mobile terminal after location detection has been performed said number of times.

31. The system of claim 30, further comprising:
transmitting information to change the parameter based on at least one of road conditions and traffic congestion along the route.

32. The system of claim 29, wherein the location information includes only one location of the mobile terminal in each of the service areas.

33. The system of claim 28, wherein the network block transmits information indicative of the traffic conditions to another mobile terminal.

34. The system of claim 33, wherein the network block transmits the traffic condition information to the other mobile terminal in response to a request signal from the other mobile terminal.

35. The system of claim 28, wherein the location information includes:
locations of the mobile terminal along the route; and
times when the locations were detected.

36. The system of claim 35, wherein each of the locations is included within a respective one of a plurality of services areas of a mobile communication system.

37. The system of claim 36, wherein the network block receives only one location for each of the service areas.

38. The system of claim 35, wherein the network block receives locations of the mobile terminal in a single transmission.

39. The system of claim 38, wherein the network block receives the single transmission after detection of a predetermined number of locations of the mobile terminal.

40. The system of claim 28, wherein the network block is included in a PCS system.

41. A traffic information collecting and providing system utilizing a mobile communication network, comprising:
a terminal for detecting and storing subscriber's location information only once by service areas of each base transceiver station and transmitting the subscriber's location information to the base transceiver station;

base transceiver stations installed on roads of specific areas requiring traffic information and receiving the subscriber's location information from the terminal;

a mobile communication network for receiving the subscriber's location information from the base transceiver station and transmitting the received subscriber's location information; and a traffic information center for receiving the subscriber's location information from the mobile communication network and checking a traffic volume and congestion conditions by processing and statistically analyzing the received subscriber's location information.

42. A traffic information collecting and providing method utilizing a mobile communication network, comprising:

collecting subscriber's location information from terminals when the terminal generates subscriber's location information according to a control signal received from base transceiver stations; and transmitting the collected subscriber location information to a traffic information center processing the collected subscriber's location information into a traffic information by statistically analyzing the collected subscriber location information, wherein the control signal is a parameter value for controlling a number of times for detecting subscriber's location information.

43. The method according to claim 42, wherein the terminal detects and stores subscriber's location information only once in each of a plurality of service areas respectively including the base transceiver stations.

44. The method according to claim 42, wherein the base transceiver stations are installed on roads of specific areas requiring traffic information.

45. A traffic information collecting and providing method utilizing a PCS network, comprising:

transmitting a control signal of base transceiver stations installed on roads of specific areas requiring traffic information to a PCS terminal, which detects and stores subscriber location information only once in each of a plurality of service areas respectively including the base transceiver stations;

collecting subscriber's location information from the PCS terminal; and transmitting the collected subscriber location information to a traffic information center, in order to process the subscriber location information into a traffic information by statistically analyzing the subscriber location information.

46. A method for processing a subscriber location information collected by a PCS network, comprising:

receiving a subscriber location information generated by the PCS terminal through the PCS network; and processing the received subscriber location information into a traffic information by statistically analyzing the subscriber location information, wherein processing the received subscriber location information into a traffic information comprises:

comparing movement distance between measured intervals with respect to time when location information is measured; and checking the traffic volume and congestion conditions of a specific interval by comparing the movement distance between measured intervals with a reference value.

* * * * *